Patented Aug. 3, 1926.

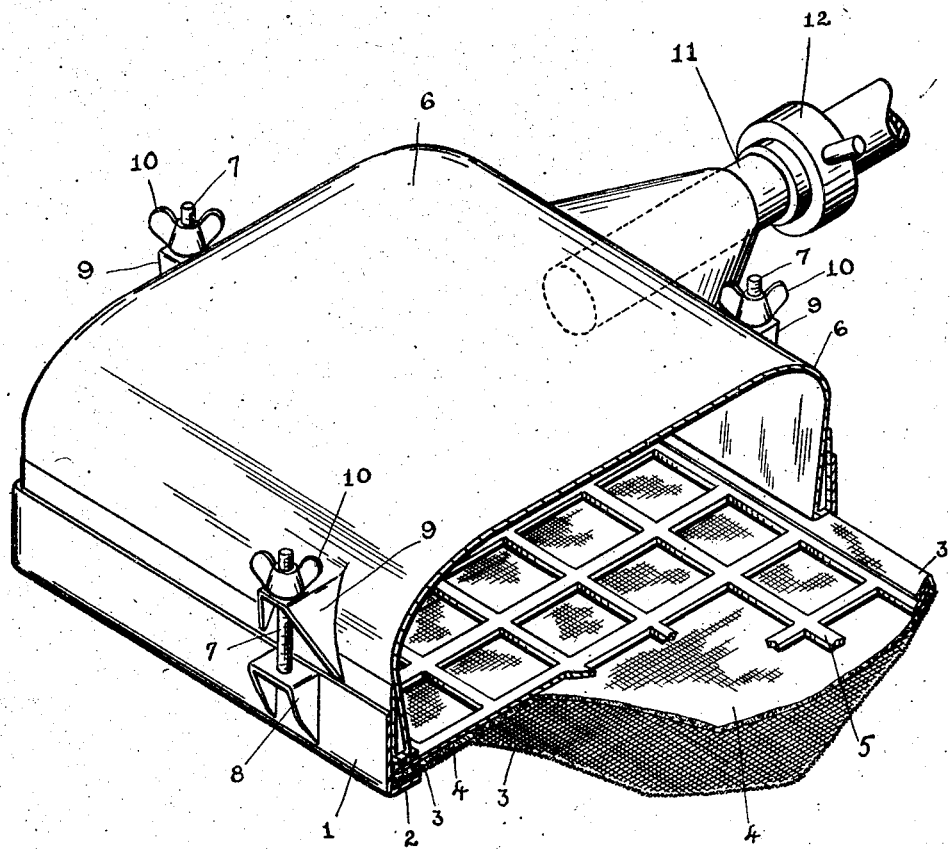

1,594,400

UNITED STATES PATENT OFFICE.

ANDREW WUEST, OF ROCHESTER, NEW YORK.

FILTER.

Application filed March 13, 1926. Serial No. 94,588.

The object of this invention is to provide a new and improved construction in a liquid filter that will make it especially adaptable for filtering milk.

These and other objects of this invention will be fully illustrated in the drawing, described in the specification and pointed out in the claim at the end thereof.

In the accompanying drawing:

Figure 1 illustrates a perspective view of the improved filter with a portion of it broken away and illustrated in section to show the construction thereof.

In the drawing like reference numerals indicate like parts.

The filter forming the subject of my present invention is especially adapted for use in connection with milk Pasteurizing apparatus and filters the milk before it enters the cooler. Sufficient filtering area is provided in the filter so that the milk filters thru the filtering material as fast as it is pumped into the filter. In the milk filters that are now in general use, a special filtering cloth or pad is necessary to secure the desired efficiency of the filter. This is not the case in my new filter as any filtering cloth or even cotton batting pads may be used to filter the milk.

As illustrated in the figure of the drawing the filter comprises a rectangular frame 1 formed up of angle iron or brass and suitably plated to prevent corrosion or rust. The angle iron is placed in the rectangular frame with the horizontal flange extending inwardly. This flange 2 provides a support on which the edges of the metal screen are adapted to rest or are suitably fastened thereto. On top of the metal screen 3 is placed the filtering pad 4 which may be of cloth or cotton batting. This pad is slightly larger than the width and length of the inside of the frame 1 and when this pad is placed on top of the metal screen, the edges thereof project up on the inside of the frame 1. A second metal screen 5 having large square openings is placed on top of the filtering pad 4 and after it is in place thereon the upwardly projecting edges of the pad surrounding the metal screen 5 are folded over the top of this screen so as to cover the edges thereof.

The casing proper of the filter is provided by the shell 6. This shell is formed of sheet metal and the walls thereof slant inwardly and have the lower edge bent outwardly and upwardly to provide a wide bearing surface at the bottom of the casing and a straight outer wall that will telescope and fit snugly into the frame 1. This casing is placed in the frame 1 with the flattened or widened edge of the casing resting on top of the overlapping edge of the filter pad 4.

The casing 6 is forced down into the frame 1 by means of a series of clamping bolts 7, 7 that are suitably anchored in the lugs 8, 8 provided on the sides of the frame 1. These bolts pass thru lugs 9, 9 provided in the sides of the casing 6 and have the thumb screws 10, 10 threaded thereon by means of which the casing can be firmly clamped down into the frame and on top of the overlapping edges of the filtering pad 4 to provide a liquid tight joint between filtering screens and the edge of the casing.

In the side of the casing 6 is provided the intake 11 having the shape of a flat nozzle terminating into a pipe and having the coupling 12 provided thereon. The milk to be filtered is pumped into the casing thru the intake 11 and distributes itself quickly over the filtering surface on the inside thereof. The milk passes thru the large openings in the metal screen 5 into the filtering pad and after passing thru the filtering pad it passes out thru the fine metal screen 3. The filtering apparatus thus efficiently filters milk or any other liquid for which the filter might be adaptable.

I claim:

In a filter, the combination of a frame, an inwardly projecting supporting flange on the inside of said frame, a fine metal screen supported on said supporting flange, a filtering pad on top of said screen, a coarse metal screen on top of said filtering pad, said filtering pad embracing the edges of said coarse metal screen and partially overlapping the top thereof, a casing having an open bottom, inwardly slanting sides on the inside of said casing, and straight sides on the outside of said casing, said straight sides telescoping into said frame, means for clamping said casing into said frame and on top of the overlapping portion of said filtering pad.

In testimony whereof I affix my signature.

ANDREW WUEST.